UNITED STATES PATENT OFFICE.

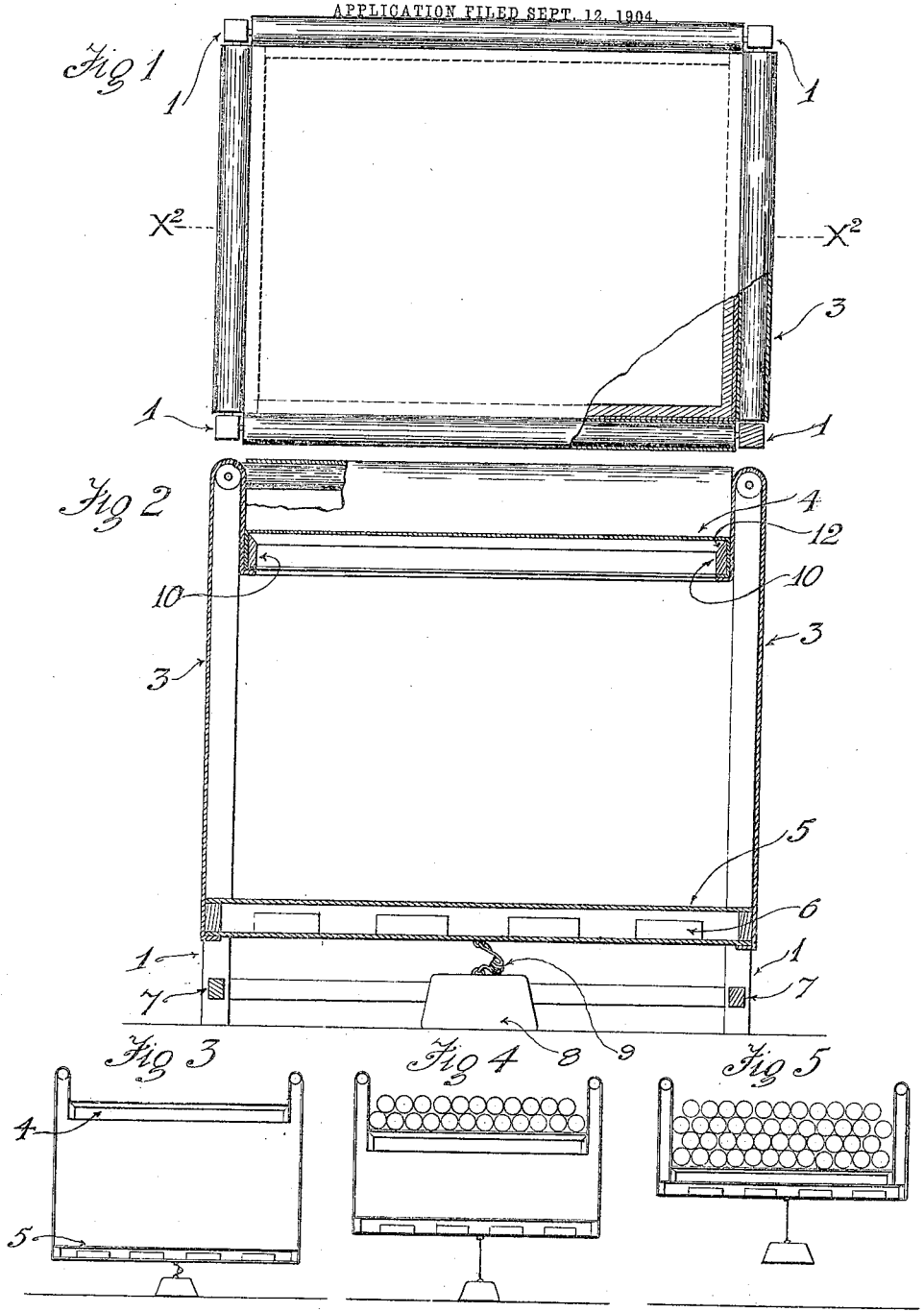

HUMPHREY M. PRAED, OF RIVERSIDE, CALIFORNIA; W. E. PEDLEY ADMINISTRATOR OF SAID HUMPHREY M. PRAED, DECEASED.

BIN.

No. 813,059.   Specification of Letters Patent.   Patented Feb. 20, 1906.

Application filed September 12, 1904. Serial No. 224,087.

*To all whom it may concern:*

Be it known that I, HUMPHREY M. PRAED, a subject of the King of Great Britain and Ireland, residing at Riverside, in the county of Riverside and State of California, have invented new and useful Improvements in Bins, of which the following is a specification.

An object of this invention is to avoid excessive drop and consequent injury to the fruit, while providing the large storage-space given by a deep bin.

Another object of the invention is to always keep the fruit near the top of the bin, so that the packer does not have to reach far for the fruit.

A further object of the invention is to so construct the bin that the fruit will not strike any hard parts and will be yieldingly supported throughout.

Another object of the invention is to so construct the bin that all the parts thereof subject to wear can be easily renewed.

My invention provides a bin whose depth will automatically vary in accordance with the amount of fruit therein, so that the fruit will not have far to drop when being placed in the bin and will not have far to be lifted when being removed from the bin.

The invention is particularly designed to facilitate handling of oranges and other citrus fruits, but is also applicable to handling of other fruits.

The accompanying drawings illustrate the invention, and, referring thereto, Figure 1 is a partly-broken plan. Fig. 2 is a vertical section on line $x^2$ $x^2$ in Fig. 1. Figs. 3, 4, and 5 are diagrammatic views showing successive positions of the bin as it is being loaded.

The bin parts are mounted on a frame 1 of any suitable size and shape. Four rectangularly-disposed rollers are journaled in said frame and support the flexible strips 3, which travel over said rollers and form the sides of the bin. The bottom 4 of the bin is connected to and supported by the four strips 3 and is adapted to travel up and down within the frame 1. The other ends of the strips 3 are connected to a platform or hanging frame 5, which is below the bottom 4 and also travels up and down within the frame 1 inversely to the movement of the bin-bottom. Said platform is suitably weighted, as at 6, so as to tend to cause the bin-bottom to rise, this movement being limited in any suitable manner, as by the frame 5 coming to rest on suitable supports 7 on the frame 1.

A supplementary weight 8 is provided, connected by a flexible connection 9 to the hanging frame 5, so that when said frame has ascended a certain distance it will pick up said weight and its further upward movement will be arrested.

The bottom of the bin desirably consists of a rectangular frame 10 and a canvas sheet or other fabric stretched tightly thereon. The top edges of frame 10 are desirably beveled or chamfered, as at 12, to avoid any sharp edges which would bear on the fruit through the canvas.

The operation is as follows: When the bin is empty, it will stand as in Figs. 2 and 3, the bin-bottom 4 standing comparatively near the top of the frame, so that a shallow bin will be presented into which the fruit can be easily rolled or dropped without any danger of injury. When the bin becomes filled to a certain depth, say nearly level with the top, the weight of the fruit therein will be sufficient to overcome the weight of counterbalance-frame 5, and the latter will rise, allowing the bin-bottom 1 to descend until the flexible suspension 9 of weight 8 is stretched taut, whereupon the bin-bottom will be held in a new position, again presenting a shallow bin-space between the top of the fruit and the top of the bin. When this opening in turn becomes filled, the weight 8 will be picked up and the bin-bottom will descend and the frame 5 rise until they are arrested by suitable means, as by coming in contact with one another, a shallow bin-space being again presented for filling. This operation may be continued as far as desired by suitably extending the principle of suspended pick-up weights.

In emptying the bin the reverse operation takes place, the bin-bottom rising automatically as the fruit is removed therefrom, so as to always present the fruit at about the level of the packer's hand.

What I claim is—

1. A bin having a yieldingly-supported bottom and counterbalancing means connected to said bottom to allow the same to yield in proportion to the weight resting thereon.

2. In a bin-bottom, the combination with the bin of flexible supports for said bottom and counterbalancing means connected to said flexible supports.

3. In a bin, the combination with the bin-bottom of flexible members forming the sides of the bin and supporting the bottom, and rollers supporting said flexible members.

4. In a bin, the combination of a frame carrying rollers, flexible strip members forming the sides of the bin, and passing over said rollers, a bin-bottom connected to the one end of said strips and counterbalancing means connected to the other end of said strips.

5. A bin having a yieldingly-supported bottom and a plurality of counterbalancing means brought successively in connection with the bottom to increase the supporting effect thereon as the bottom is lowered.

6. A frame, rollers journaled thereon, flexible strips passing over said rollers and forming the sides of said bin, a bin-bottom connected to one end of each strip and a counterbalancing-frame extending under the bin-bottom and connected to the other end of each strip.

7. A frame, rollers journaled thereon, flexible strips passing over said rollers and forming the sides of said bin, a bin-bottom connected to one end of each strip, a counterbalancing-frame extending under the bin-bottom and connected to the other end of each strip, and a supplementary weight suspended from the counterbalancing-frame.

8. A bin having flexible sides and bottom, and comprising a bottom frame over which the flexible bottom is stretched said bottom frame having chamfered upper edges.

In testimony whereof I have hereunto set my hand, at Los Angeles, California, this 3d day of September, 1904.

HUMPHREY M. PRAED.

In presence of—
A. P. KNIGHT,
A. M. HOLLY.